Sept. 3, 1940.   G. JENDRASSIK   2,213,939
APPARATUS FOR GAS TURBINES
Filed June 25, 1938

Witness
Julius Varga

Inventor:
George Jendrassik

Patented Sept. 3, 1940

2,213,939

UNITED STATES PATENT OFFICE 2,213,939

APPARATUS FOR GAS TURBINES

George Jendrassik, Budapest, Hungary

Application June 25, 1938, Serial No. 215,811
In Hungary June 26, 1937

2 Claims. (Cl. 60—41)

Gas turbine proposals are known in which the output of the gas turbine is controlled by varying the temperature of the working fluid entering the turbine, that is to say by varying the quantity of heat introduced. In some of these proposals preferably a heat exchange device serving for the transmission of the heat of the gases leaving the turbine to the compressed working fluid is also employed.

It is a drawback of this method of control that by diminishing the quantity of heat introduced, the temperature of the working fluid expanding down in the turbine as well as the back-pressure of the compressor and therewith also the pressure drop of the turbine will also become diminished, in consequence whereof, besides the deterioration of the thermal efficiency of the apparatus, the weight of the air supplied by the compressor will also become substantially increased. Thus, although by diminishing the quantity of heat introduced it is possible to influence the output of work of the apparatus in the direction of decrease, the fact of the quantity of gas flowing through the apparatus having become increased will influence the said output in the contrary sense and accordingly will necessitate a greater diminution of the temperature in order to obtain a certain given fractional output whereby the thermal efficiency will be deteriorated in a still greater extent. It is particularly in the case of compressors possessing a so-called "flat" pressure-volume characteristic that the circumstance referred to becomes troublesome, this being understood to refer to such compressors in which in the case of the diminution of the over-pressure produced the percentual increase of the gas volume supplied is greater than the percentual diminution of the overpressure.

Starting from the recognition of this circumstance, the invention prescribes the employment, for gas turbines, of a compressor of such a kind the pressure-volume characteristic of which is very steep i. e. with which the variation of the back-pressure will in the neighbourhood of the ordinary service condition cause the volume of air drawn in to become altered in a very slight extent only. A gas turbine plant fitted with a compressor of this type will react in a very sensitive manner on any variation of the quantity of fuel introduced, and will in the case of varying loads operate at a substantially higher efficiency than a gas turbine plant fitted with a compressor possessing a flat characteristic.

Figure 1:
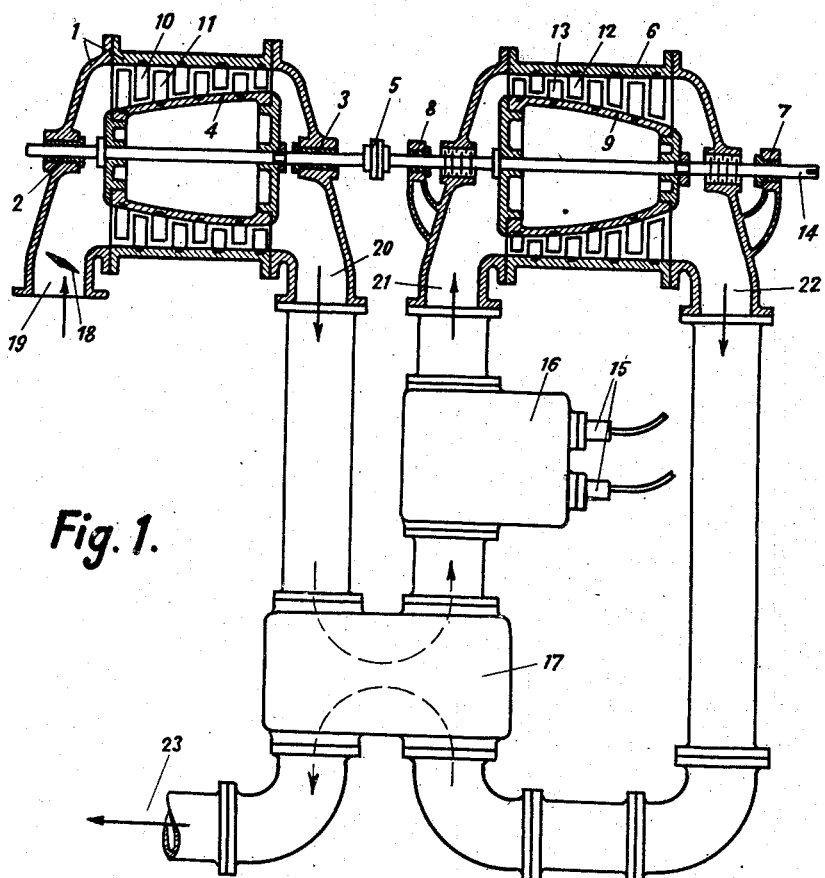
Figure 2:
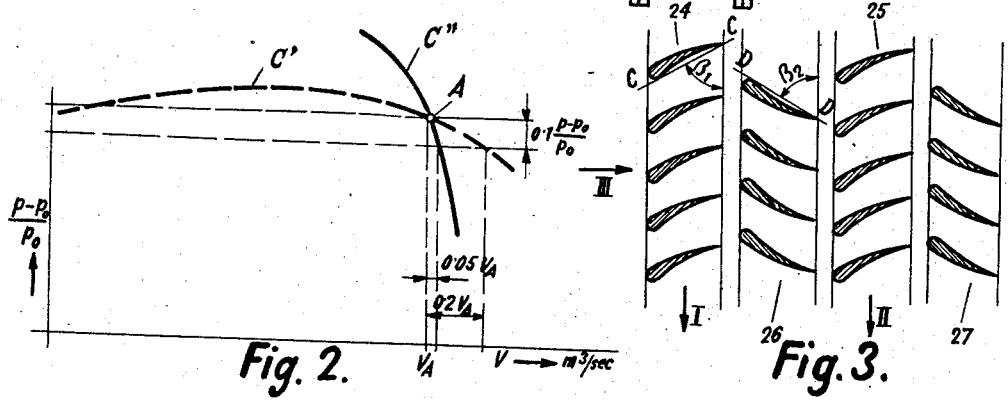
Figure 3:
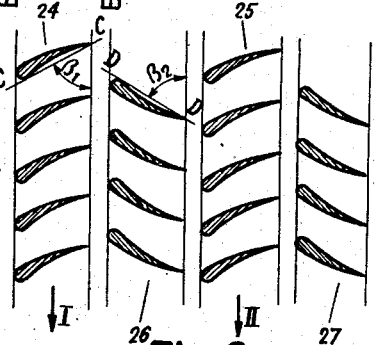

In order to enable the invention to be more readily understood, Fig. 1 illustrates a diagrammatical sectional drawing of a gas turbine plant shown, by way of example, Fig. 2 shows both (flat and steep) types of pressure-volume compressor characteristic, and, finally, Fig. 3 is the image, developed into a plane, of a section taken through the blades of a compressor having a steep pressure-volume characteristic.

In the apparatus according to Fig. 1 the compressor casing 1 is accommodating the rotor 4, journalled in the bearings 2 and 3, the said rotor 4 being, through the shaft coupling 5, coupled with the turbine rotor 9, accommodated in the turbine casing 6 and journalled in the bearings 7 and 8. The stationary blade rings 10 of the compressor are arranged in the compressor casing 1, whereas the rotary blade rings 11 thereof are mounted in the compressor rotor 4. The stationary blade rings 12 of the turbine are fixed in the turbine casing 6, whilst the rotary blade rings 13 of the turbine are fixed in the rotor 9. The mechanical energy generated can be taken off at the shaft end 14.

In the embodiment shown by way of example the fuel is introduced by means of the burners or atomizers 15, whilst the combustion is effected in the combustion chamber 16. For the purpose of transferring the heat of the expanded gases leaving the turbine to the compressed fresh gas, the heat exchange device 17, shown diagrammatically on the drawing, is employed. The throttle-valve 18 serves for the control of the quantity of air admitted into the compressor. This apparatus operates in the following manner.

The air enters the rotary compressor through the duct 19, and leaves the compressor in compressed condition through the duct 20. Following this the air flows through the heat exchange device 17, in which it absorbs a portion of the contents of heat of the spent gases leaving the turbine. Following this the air passes into the combustion chamber 16, in which the combustion at least in part, of the fuel introduced takes place. The compressed and heated air enters the turbine through the inlet duct 21 and after expanding in the turbine leaves the latter through the duct 22. Following this the gas leaving the turbine passes into the heat exchange device 17, where it transmits its heat to the fresh air coming from the compressor and finally it leaves the apparatus through the duct 23. The control of the output of this apparatus is effected by varying the quantity of fuel introduced, and in accordance herewith the temperature of the gas expanding in the turbine will also be lower in the case of diminished useful output than at full load. In case a compressor of flat pressure-volume characteristic, e. g. some variant of the usual type of centrifugal compressors should be employed by way of compressor, its characteristic would have the form of the curve C', shown in broken lines on Fig. 2. The ordinate of this characteristic shows the ratio of the overpressure $p-p_0$ produced by the compressor and of the initial pressure $p_0$, whilst its abscissa shows the volume of air drawn in per second, and in what follows the expression "ratio of pressures" should always be understood to mean the corresponding figure expressed in terms of overpressure. The curve traced on Fig. 2 relates to a given number of revolutions per minute of the compressor. If the point marked "A" on the drawing is the point corresponding to the normal service condition of such a compressor, the volume supplied will in the case of a flat pressure-volume characteristic become increased by e. g. 20% of the normal supply in case of the diminution by 10%, in the neighbourhood of the normal condition of service, of the pressure ratio produced. Accordingly, if during the course of the control of the turbine plant the quantity of heat introduced is diminished in such an extent as to cause the pressure drop set-up in the turbine being diminished by 10% of the pressure drop corresponding to the condition of normal load, which will approximately be the case if the temperature of the gas entering the turbine becomes diminished from 450° C. to 375° C., the volume of air drawn in will in the case of a compressor possessing a flat characteristic become increased in a very substantial extent e. g. by 20% and therefore it is only in a much smaller degree that the useful output of the turbine will diminish, which fact necessitates a further diminution of temperature.

The curve C'' traced in a full line on Fig. 2 represents the characteristic of a compressor of the kind suitable for being employed in an apparatus according to the invention. The ordinate here again represents the pressure ratio produced, whilst the abscissa represents the volume drawn in. In this case a variation of the pressure ratio by 10% in the neighbourhood of the point "A" corresponding to the normal service condition will only cause a very slight alteration e. g. an alteration by 5% of the volume drawn in by the compressor. Compressors possessing a so steep characteristic are represented by the type of compressors in which the mean diameter of some stationary or rotating blade ring is at least approximately of the same magnitude as the average figure of the mean diameters of the blade rings adjacent to it and in which the section of blades is similar to the wing profiles known in aerodynamics. Such a compressor may be of the axial through-flow type, as shown also by way of example on Fig. 1, in which case the working fluid is flowing between cylindrical surfaces, or between conical surfaces possessing a small apex angle, through the rotating and the stationary blades, but it is also possible for the compressor to be of the radial throughflow type, or it is also possible for the gas to flow between two limiting surfaces of a conical shape possessing a larger apex angle or between two limiting surfaces having curved generatrices.

Fig. 3 represents the section taken on the internal circle of the blades of the blading of a compressor possessing such a steep characteristic, which section has been developed into a plane. The arrows I and II are representing the directions of the peripheral velocities of the rotating blade rings 24 and 25, respectively, whereas the arrow III indicates the direction of the meridian speed component. The rings 26 and 27 are stationary blade rings. Experience shows that it is possible to construct a compressor possessing a steep characteristic with a very good efficiency by employing an arrangement in which the base lines C—C and D—D of the profiles of the stationary and moving blades (the lines traced tangentially to the concave side of the blade profiles), respectively, are forming with the peripheral direction angles $B_1$ and $B_2$ the magnitude of which is situated between the limits of 30°–75°, and which two angles are preferably mutually equal. From the point of view of steepness the employment of a large number of stages and of a high peripheral speed is advantageous, but a sufficiently steep characteristic can already been obtained also by means of four stages.

It is a matter of course that the compressor described in what precedes does not exhaust all the possibilities of the construction of compressors of steep characteristic, but only indicates a single possibility of construction.

A further advantage of a compressor of this type is also represented by the fact that it is possible to construct it so as to possess a very high efficiency, which fact is of first-rate importance particularly in the case of gas turbine plants. A type of control of very satisfactory efficiency can be obtained in case the compressor is constructed so as to possess a characteristic of such steepness, as will, according to what has been said above, ensure that in case of a diminution of the overpressure corresponding to the normal condition of service by 10% the volume drawn in by the compressor should not become increased by more than 5%.

The employment of a compressor possessing a steep characteristic offers advantages also in that case if it is not purely by varying the temperature i. e. the quantity of heat introduced that control is effected but if at the same time the quantity of air supply by the compressor is, by means of the throttle-valve 18 arranged in the inlet duct of the compressor, varied also. In this case the compressor described possessing a steep characteristic is, on the one hand, advantageous owing to its high efficiency, whilst on the other hand it enables the control to be performed with high efficiency also in such a manner that it should be sufficient if the variation of the quantity of air drawn in by the compressor is effected in steps only, between which steps further control can be effected by varying the quantity of heat introduced. Further, it is also possible to combine the variation of the quantity of air with the variation of the temperature, so as to vary both of these when effecting the control. In this case also, the employment of a compressor possessing a steep characteristic offers an advantage, which advantage however is of course no longer of an as great magnitude as in the case when it is purely by varying the temperature that control is effected.

I claim:

1. In an apparatus for gas turbines preferably fitted with a heat exchange device, a rotary compressor, having at least four stages, supplying the working medium under pressure, a turbine performing work by means of the expansion of the heated working medium, and blade rings in the compressor the mean diameter of any of which is at least approximately equal to the average figure of the mean diameters of the adjacent blade rings, and in which the magnitude of the angles formed on the internal circle of the blades by the base lines of the blade profiles (the lines traced tangentially to the concave side of the blade profiles) with the peripheral direction is between the limits of 30° and 75° selected so that in it, with a given speed, the decrease by 10% of the normal service overpressure will cause the volume of gas drawn in to be increased in an extent smaller than 5%.

2. In an apparatus for gas turbines preferably fitted with a heat exchange device, a rotary compressor, having at least four stages, supplying the working medium under pressure, a device for introducing heat into the compressed working medium, and blade rings in the compressor the mean diameter of any of which is at least approximately equal to the average figure of the mean diameters of the adjacent blade rings, and in which the angles formed on the internal circles of the stationary and of the rotating blades by the base lines of the blade profiles (the lines traced tangentially to the concave side of the blade profiles) with the peripheral direction are in each particular compressor stage mutually equal, the said angles being, within the limits of 30° and 75°, selected so that in the compressor, with a given speed, the decrease by 10% of the normal service overpressure will cause the volume of gas drawn in to be increased in an extent smaller than 5%.

GEORGE JENDRASSIK.